Jan. 16, 1940.  A. L. STONE ET AL  2,186,999
OIL FIELD POWER PLANT
Filed Dec. 22, 1937   3 Sheets-Sheet 1

Inventors:
Albert L. Stone.
Allen E. Rice.
Joseph H. Appleton.

Attorney.

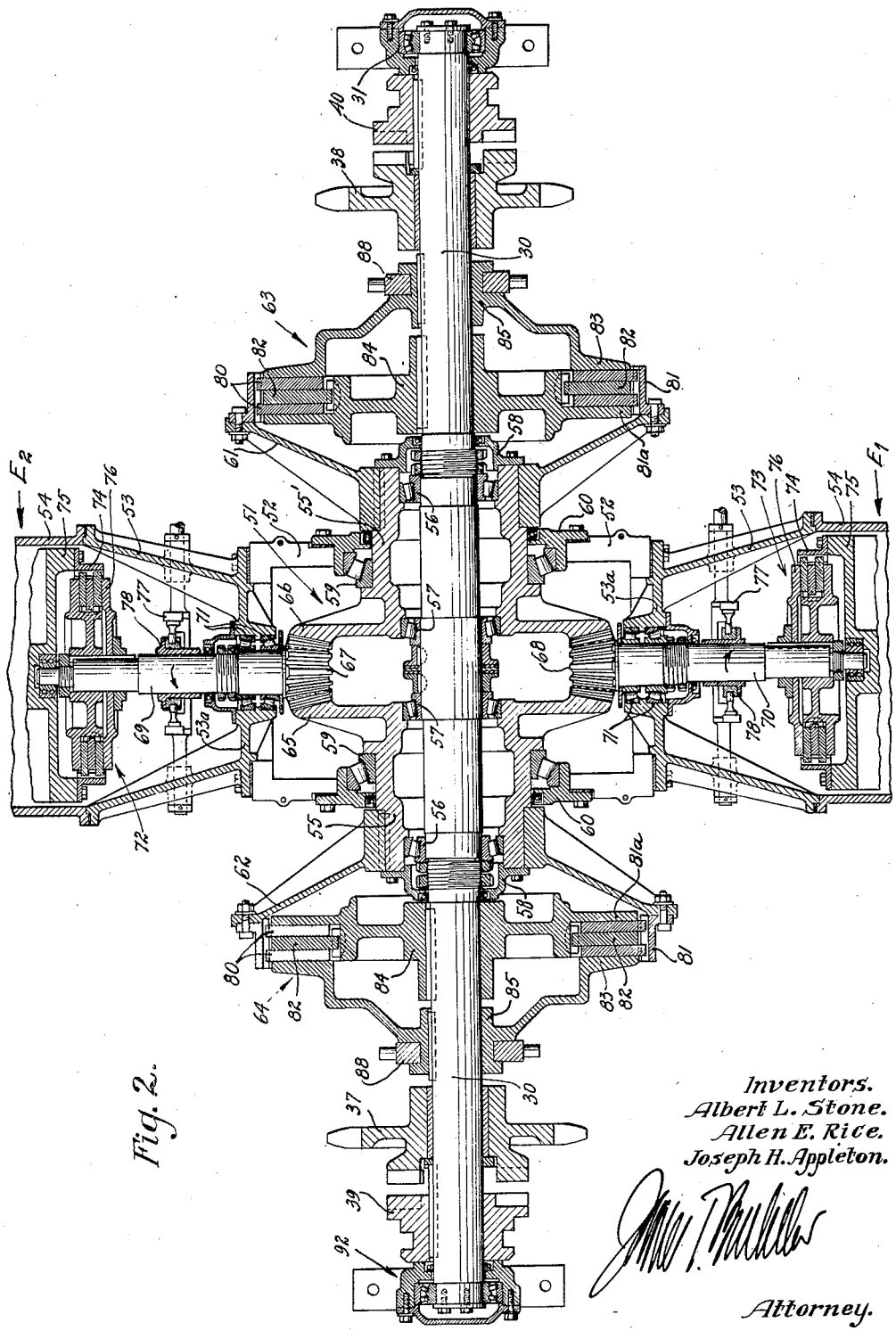

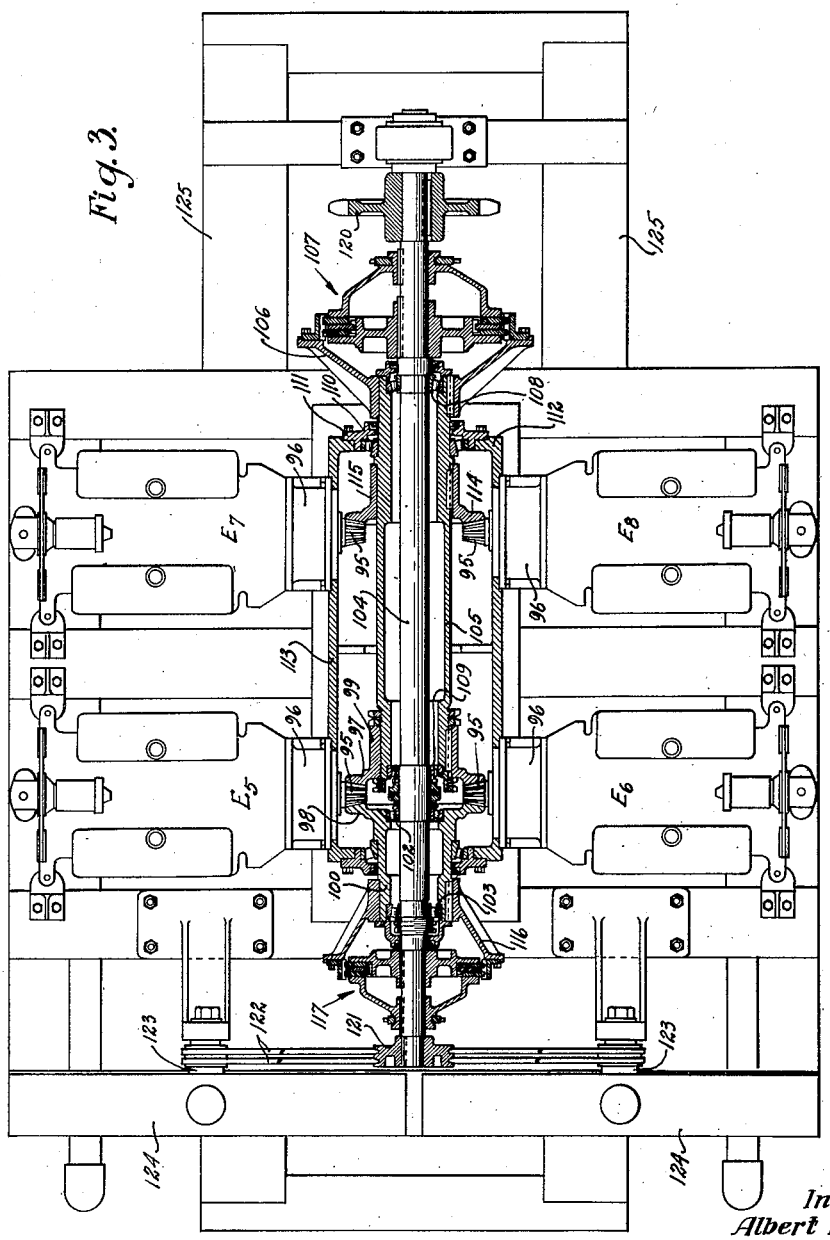

Patented Jan. 16, 1940

2,186,999

UNITED STATES PATENT OFFICE 2,186,999

OIL FIELD POWER PLANT

Albert L. Stone and Allen E. Rice, Palos Verdes Estates, and Joseph H. Appleton, Los Angeles, Calif., assignors to Hydril Company, Los Angeles, Calif., a corporation of California Application December 22, 1937, Serial No. 181,140

3 Claims. (Cl. 74—389)

This invention relates generally to multiple cylinder engine power plants for operating oil well drilling equipment, i. e., the draw-works, mud pumps and other equipment, and deals particularly with improvements in the arrangement of the engine units with relation to the line shaft, the provision of direct driving reduction, one-to-one, or overdrive gear connections between the engines and the driven shaft, and a simplified reversing mechanism, all of which give the plant a number of important advantages not possessed by any type of plant heretofore available for the operation of oil field equipment. The invention is adaptable to plants powered either by multiple cylinder steam or internal combustion engines. For purposes of illustration, the invention will hereinafter be described with reference to internal combustion engine plants, but with this understanding.

For some time it has been the practice to use multiple engine power plants in oil field operations, and in all instances of which we are aware, the engines have been arranged at one side of the driven or power take-off shaft and the drive from the engines to the shaft has required multiple belt or chain combinations which, because of their unavoidable complications, arrangement and size, add greatly to the bulk and expense of the equipment. As compared with the present plant, they are considerably less compact and less conveniently portable and adaptable to arrangement with relation to the draw-works and pumps.

The practice heretofore has been to use slow speed engines of comparatively great horse power, but because of their size, weight and cost, the adoption of such units has not been so widespread as the possibilities warrant, if it were possible for the size and arrangement of the units and their driving connections to be altered to simplify the plant and render it more flexible to specific power requirements. In the usual situation, large engines are required because of possible maximum load conditions, but for many if not most operating loads the units are overpowered, and necessarily so because the size of the engines precludes the possibility of reducing or dividing the developed power to approximate the load requirements for less than full load operation and at the required speeds. Added to the uneconomical operation of such units is a very substantial increase in their initial cost due to the requirement of expensive reversing gear mechanisms. In practically all instances, the forward drive is through the reversing mechanism, and the latter therefore must be designed to transmit the full potential power of all the engines, notwithstanding the fact that only a fraction of the full power is required in the usual reversing operation. The reversing gear consequently is a sizeable and expensive part of the plant, involving further complications and adding to the number and bulk of the required parts.

In contrast to power plants of the type referred to above, the present invention is characterized by its relative simplicity in construction, operating flexibility in conformance to power requirements, and the elimination of many complicated and expensive features such as the usual gear type reversing mechanism. In accordance with the invention, the plan comprises one or more pairs of engines, with the engines of each pair arranged at opposite sides of a common driven or line shaft. Each engine has a substantially direct gear connection with the shaft, eliminating the usual multiple belt or chain connections. Preferably the driving connection between each pair of engines comprises a common driven gear that is rotatable relative to the line shaft, and a pair of engine driven pinions meshing with the driven gear. Forward drive is transmitted to the shaft by clutching the driven gear thereto. A novel and greatly simplified reversing mechanism is provided by placing about the line shaft a second (reversing) relatively rotatable gear which is driven, preferably by the engine driven pinions, oppositely with relation to the first mentioned driven gear, and releasably clutching the reversing gear to the shaft. The forward and reverse drive controls thus comprise merely a pair of selectively operable clutches associated with a simple and compact gear drive between the engines and the shaft.

The present engine arrangement, driving connections and controls lends itself to the use of a plurality of relatively low powered individual engines that can be thrown into or out of service to meet particular load requirements, and made to conform in power out-put with the load, with a degree of flexibility in the operation of the unit as a whole, not possible in the usual plan. A simple arrangement of clutches permits the drive from any selected engine or engines to be disconnected, and, moreover, permits the least power required, usually that of one engine alone, to be used in reversing operations. The invention also provides for the use of any desired number of pairs of engines having direct and simple gear connections with a common driven member, a single clutch for releasably engaging said member with the shaft, and a single clutch reversing mechanism operable when any one of the engines is running.

All the above mentioned features of the invention, as well as various additional objects and details thereof, will be understood to better advantage from the following detailed description of certain illustrative oil well power plants typifying the invention in its preferred forms. Reference is had throughout the description to the accompanying drawings, in which:

Fig. 2 is a detailed sectional view showing the driving connections and clutch assemblies between one pair of oppositely positioned engines and the driven shaft; and Fig. 3 is a sectional view showing a multiple pair arrangement of engines and their driving connections with a common driven shaft.

Figure 1:
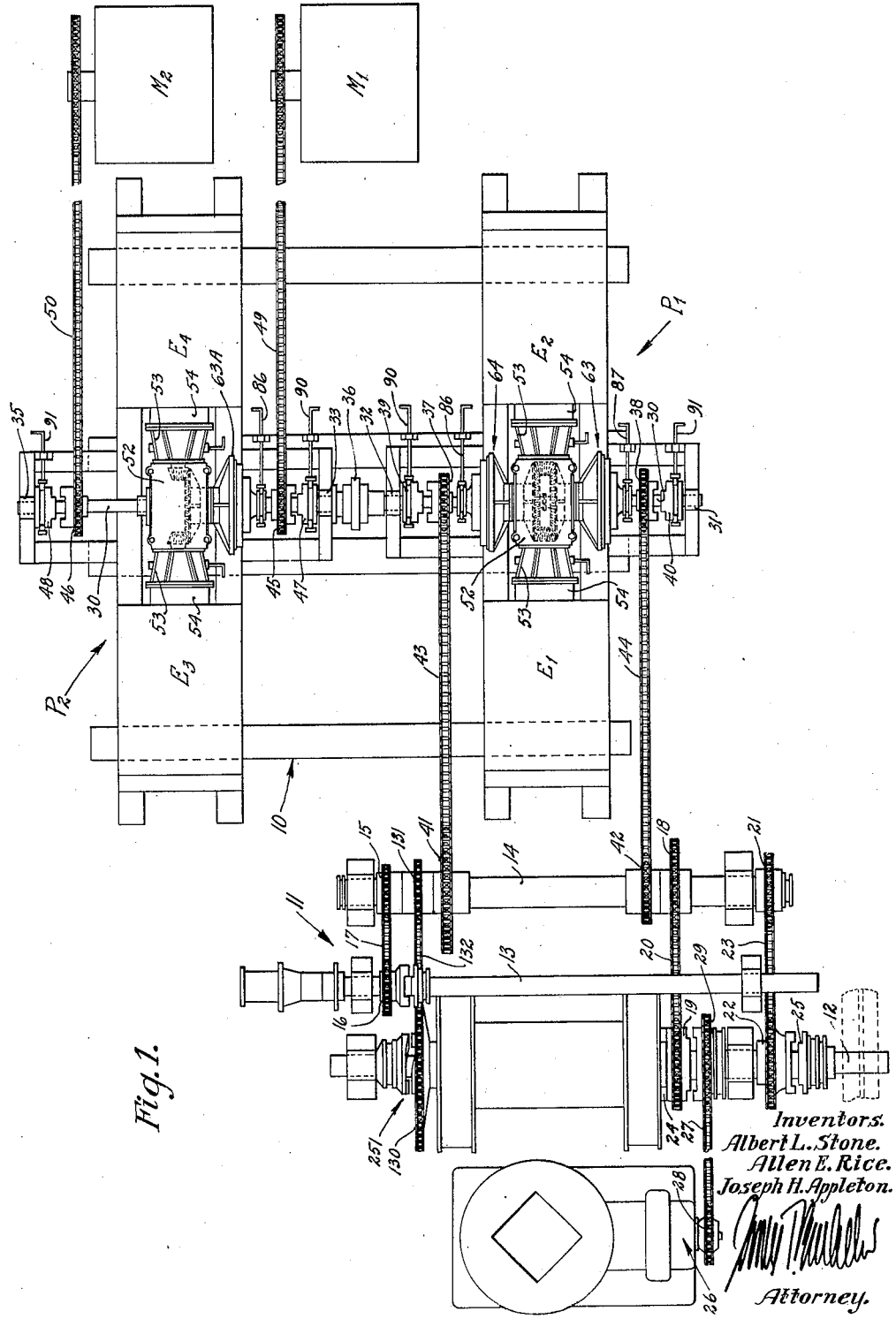
Fig. 1 is a general plan view showing one typical form of power plant embodying the invention, connected to conventionally illustrated draw-works and to the circulating mud pumps.

Referring first to the general view in Fig. 1, the power plant 10 is shown to have the usual driving chain connections with the conventionally illustrated draw-works 11 which, typically, includes the winding drum shaft 12, cat line shaft 13 and jack shaft 14, the latter driving the shaft 13 by way of sprockets 15, 16 and chain 17, and driving the drum shaft by way of sprockets 18, 19 and chain 20, the differential speed combination of sprockets 21, 22 and chain 23, and the low speed drive including sprockets 130, 131 and chain 132. The usual clutches, diagrammatically indicated at 24, 25 and 251 are provided for releasably engaging sprockets 19, 22 and 130 with the drum shaft. The rotary table drive, generally indicated at 26, is operated by chain 27 carried on sprocket 28 and a sprocket 29 clutched to sprocket 19 on the drum shaft.

As will later be made more fully apparent, the power plant may include one pair, or a series of pairs of internal combustion engines positioned at opposite sides of a common drive shaft. As a typical illustration, the plant 10 in Fig 1 is shown to comprise two pairs, generally indicated at $P_1$ and $P_2$, of internal combustion engines $E_1$, $E_2$, $E_3$ and $E_4$, the engines in each individual pair being positioned at opposite sides of and extending at susbtantially right angles with relation to the common drive shaft or line shaft 30. The latter is shown to be supported in bearings 31, 32, 33 and 35, and to comprise two sections, one for each unit $P_1$ and $P_2$, interconnected by a suitable form of flexible joint 36, such as a gear type coupling. The line shaft 30 may carry any suitable number and arrangement of driving sprockets in accordance with the number and location of the work units to be driven. As typical, the shaft 30 is shown to carry sprockets 37 and 38 with their clutches 39 and 40, respectively, for driving the differential jack shaft sprockets 41 and 42 by way of chains 43 and 44. The conventionally illustrated mud pumps $M_1$ and $M_2$ are driven by way of a second pair of line shaft carried sprockets 45, 46, clutches 47, 48 and chains 49 and 50.

Preferably the engines $E_1$, $E_2$, $E_3$ and $E_4$ will be provided with some suitable form of control (not shown) whereby the engines will operate at corresponding power out-put. Such types of multiple engine controls are known and do not require specific illustration or explanation. As will later appear, the line shaft 30 may be driven by any one or combination of the engines, the same being true for either forward or reverse drive. This feature is of importance in that individually, the engines may be relatively low powered but capable together of developing the full power requirements of the draw-works and mud pumps. The unit is made flexible to meet the requirements of part load performance without at such time being excessively or materially over-powered, by reason of the relatively low power capacity of each individual engine, and the ability at any one time to use the engines in any number and combination to drive the work.

The relative arrangement of the line shaft and engines, the driving connections between the engines and the shaft, together with the reversing mechanism, can best be understood from the detailed showing of Fig. 2. This view shows the driving connections from one oppositely positioned pair of engines which, as will be understood, may comprise an entire power unit, or one of a series of pairs of engines in a multiple pair arrangement as shown in Fig. 1. For purposes of correlation, Fig. 2 is illustrative of the reversing mechanism and driving connections between engines $E_1$, $E_2$ and the line shaft 30.

A reduction gear mechanism, generally indicated at 51, is contained within a housing 52, opposite sides of which are connected with clutch housings 53 which in turn are attached to the engine fly wheel housings 54. Shaft 30, extending centrally through the reduction gear housing 52, carries a pair of sleeves 55 and 55' rotatable about the shaft on combined radial and thrust bearings 56 and 57, the outer ends of the sleeves carrying sealing rings 58 which prevent access of dirt particles along the shaft into the housing and gear mechanism 51. Sleeves 55 and 55' are journaled within the ends of the housing 52 on bearings 59 mounted within flanged rings 60 bolted to the housing. Keyed to the outer end portions of the sleeves and rotatable therewith are the housings 61 and 62 for the forward and reverse clutch mechanisms generally indicated at 63 and 64.

Sleeves 55 and 55' carry at their opposed inner ends a pair of bevel gears 65 and 66 which may conveniently be formed integrally with the sleeves or otherwise attached thereto in any suitable manner. Gears 65 and 66 are driven in relatively opposite directions by pinion gears 67 and 68 meshing therewith and terminally carried on the engine driven pinion shafts 69 and 70 journaled in compound bearings 71 supported within the inner end walls 53a of the clutch housings 53. The pinion gear shafts 69 and 70 are driven directly from the engine crank shafts, not shown, through suitable clutches generally indicated at 72 and 73. These are shown typically as well known friction type clutches, one section 74 of the clutch being applied to the engine fly wheel 75, with the other section 76 keyed to and slidable longitudinally on the pinion gear shaft. The clutches are manually operable by the usual yoke connection 77 with a sleeve 78 slidable longitudinally on the shaft. Clutches 72 and 73 thus may be operated to throw the engines $E_1$ and $E_2$ into or out of driving relation with the line shaft 30.

Clutches 63 and 64, which likewise may be of any suitable form, provide releasable and selective driving connections between sleeves 55' and 55, and the shaft 30, clutch 63 establishing what is referred to as the forward drive, and clutch 64 the reverse drive. Typically, these clutches also are shown as a friction type design in which disks 80 keyed to the housing flange 81 and slidable axially thereof, are engageable between disks 81a, 82, and disc 83 carried by sleeves 84 and 85, respectively, both of which are keyed to the shaft 30 and slidable longitudinally thereon. The clutches are manually operated by suitable connections 86 and 87, see Fig. 1, with yokes 88 carried on sleeves 85.

The free running sprockets 37 and 38 placed on the shaft 30 beyond the clutches 64 and 63, are selectively engageable with the shaft 30 by clutches 39 and 40 operated by suitable controls conventionally illustrated at 90 and 91. In a two engine unit, the shaft 30 may be terminated within a bearing 92 as illustrated in Fig. 2, or if a multiple pair arrangement of engines is used as in Fig. 2, the shaft may be extended through the bearing 32 to the flexible coupling 36. It will be further understood that in a two engine plant as typified by Fig. 2, shaft 30 may be extended to accommodate any desired number and arrangement of power take-off sprockets for driving the draw-works, mud pumps and the like.

In operation, the pinion gear shafts 69 and 70 being driven in opposite directions of rotation as indicated by the arrows, drive gear 66 and sleeve 55' in a direction corresponding to what has been termed forward rotation of the shaft 30. Accordingly, the shaft may be driven in forward rotation by engaging clutch 63, leaving the reversing clutch 64 disengaged. Since gear 65 is oppositely driven with relation to gear 66, sleeve 55 is at all times rotated in a reverse direction with reference to sleeve 55'. Consequently all that is required to reverse the rotation of the line shaft 30 is to disengage clutch 63 and engage the reversing clutch 64. As mentioned herinabove, the simplicity of the reversing mechanism is a highly important feature from standpoints of structural advantage, ease of operation and greatly reduced cost.

Referring again to Fig. 1, the relative arrangement and driving connections between engines $E_3$ and $E_4$ and the shaft 30, may be in all respects the same as those described with reference to Fig. 2, except that the reversing mechanism including clutch 64, sleeve 55 and gear 65, need not be provided. Ordinarily the power requirements during reverse operation are sufficiently low that the power from either or both of engines $E_1$ and $E_2$ will suffice. The power of either or both of engines $E_3$ and $E_4$, together with or independently of engines $E_1$ and $E_2$, may be used in forwardly driving shaft 30 by engaging clutch 63A which corresponds to clutch 63 in Fig. 2. Thus the draw-works 11 and mud pumps $M_1$, $M_2$ may be operated by either or both pairs of engines $P_1$ and $P_2$, or, by reason of the individual clutch connections between the engines and the line shaft, by any combination of engines in the two pairs. As will be understood, during reversing operation, clutches 47 and 48 may be released to disconnect the pump drives.

Fig. 3 shows a variational form of power unit in which a plurality of pairs of engines are arranged at opposite sides of a common driven shaft, this form differing principally from that shown in Fig. 1 in that the engines all directly drive a single or common sleeve rotatable about the line shaft and having clutched engagement therewith. For purposes of illustration, there is shown two pairs of engines $E_5$, $E_6$, $E_7$, $E_8$, although it is to be understood that the unit may be extended to accommodate any additional number of series of engines simply by extending the line shaft and common driven sleeve or quill. As described in detail with reference to Fig. 2, each of the oppositely positioned engines drives a pinion gear 95 through a clutch connection in housing 96 with the engine crank shaft. Each gear 95 driven by the engines $E_5$ and $E_6$ meshes with bevel gears 97 and 98 carried by sleeves 99 and 100, the latter being rotatable on bearings 102 and 103 about the line shaft 104. Sleeve 99 is keyed or otherwise secured to an elongated quill 105 which at its outer end carries the housing 106 of the forward drive clutch 107 which corresponds in structure and function to clutch 63 of Fig. 2. The quill 105 is rotatable about the shaft 104 on bearings 108 and 109, and is journaled within the bearing 110 mounted in ring 111 within the end wall 112 of the housing 113 that encloses the reduction gears of both pairs of engines.

The pinion gears driven by engines $E_7$ and $E_8$ drive a common bevel gear 114 intergeared with sleeve 115 keyed to the quill 105. Gears 95 thus drive the sleeves 99, 115 and the quill 105 in the same direction of rotation, which corresponds to what has been referred to as forward rotation of the line shaft 104. Since both series of engines are drivingly connected to the common quill, the single clutch 107 serves to releasably connect the quill and shaft for the forward drive.

Sleeve 100 carries the housing 116 of the reversing clutch 117 corresponding to clutch 64 in Fig. 2. With clutch 107 disengaged, the reversing clutch 117 may be engaged to reverse the rotation of shaft 104, as previously explained. It may be observed that since sleeve 100 and the quill 105 are rotatively interconnected by the gears 95 driven by engines $E_5$ and $E_6$, shaft 104 may be reversed by the power of any one or combination of engines. If engines $E_7$ and $E_8$ are out of service then the reverse drive is from engines $E_5$, $E_6$, or both, directly through sleeve 100. On the other hand, should both engines $E_5$ and $E_6$ be out of service, then the reverse drive occurs with quill 105 rotating in a forward direction, through gears 95 meshing with gear 98 and driving sleeve 100 in a direction reversely with relation to the quill. The clutch connections, not shown in Fig. 3, between the engines and the pinion gears 98 may of course be operated to maintain all or any combination of engines in operation at any one time, thus providing for flexibility in power out-put, the importance of which has been previously stressed.

One end of the line shaft 104 is shown to carry a single power take-off sprocket 120, although it will be understood that the shaft may be extended beyond either or both of the clutches to accommodate any additional number and arrangement of sprockets. The reversing clutch end of the shaft is shown to carry a pulley 121 that drives the fan belts 122, the fans being carried on shafts 123 and concealed within the radiator shells 124. The entire plant may conveniently be mounted on longitudinally extending skids 125 so as to be transportable and readily positioned, as a unit, with relation to the work to be driven.

It will be understood that the drawings are merely illustrative of the invention in certain of its typical and preferred forms, and that various changes and modifications may be made without departure from the invention in its intended spirit and scope.

We claim:

1. A power unit including a line shaft, a pair of engines, a pair of pinions, a pair of drive connections extending, one each, between the power shafts of the engines and the pinions, the extended axes of the pinions crossing the line shaft axis at points spaced longitudinally thereof, a clutch interposed in one of said drive connections, a pair of gears rotatable about the line shaft and meshing, one each, with said pinions at corresponding sides of the pinions, a drive connection between said gears, a clutch drive connection between one of said gears and said line shaft, a third gear rotatable about the line shaft and meshing with one of said pinions at the side opposite that meshed by one of the pair of gears, and a clutch drive connection between said third gear and said line shaft.

2. A power unit including a line shaft, a pair of engines, a pair of pinions, a pair of clutch drive connections extending, one each, between the power shafts of the engines and the pinions, the extended axes of the pinions crossing the line shaft axis at points spaced longitudinally thereof, a pair of gears rotatable about the line shaft and meshing, one each, with said pinions at corresponding sides of the pinions, a drive connection between said gears, a clutch drive connection between one of said gears and said line shaft, a third gear rotatable about the line shaft and meshing with one of said pinions at the side opposite that meshed by one of the pair of gears, and a clutch drive connection between said third gear and said line shaft.

3. A power unit including a line shaft, a pair of engines arranged with the extended axes of their power shafts crossing the line shaft axis at points spaced longitudinally thereof; a pair of pinions, a pair of drive connections, one each, between said power shafts and said pinions, a clutch interposed in the drive connections between one power shaft and the associated pinion, a pair of gears rotatable about the line shaft, said gears meshing with said associated pinion at opposite sides thereof, a clutch drive connection between one of said gears and the line shaft, a third gear rotatable about the line shaft and meshing with the other pinion at the side thereof corresponding to the side at which the other of said pair of gears meshes with said associated pinion, a drive connection between said third gear and said other gear, and a clutch drive connection between said third gear and said line shaft.

ALBERT L. STONE.
ALLEN E. RICE.
JOSEPH H. APPLETON.